UNITED STATES PATENT OFFICE 2,606,920

PROCESS FOR MAKING 4-TERTIARY-BUTYLPHENYL SALICYLATE

Wesley C. Stoesser, Midland, and Edmund H. Sommerfield, Bay City, Mich., assignors to The Dow Chemical Company, Midland, Mich., a corporation of Delaware No Drawing. Application May 15, 1950, Serial No. 162,136

8 Claims. (Cl. 260—474)

This invention concerns an improved process for making 4-tertiary-butylphenyl salicylate. It relates more particularly to the production of 4-tertiary-butylphenyl salicylate by reaction of 4-tertiary-butylphenol and salicylic acid.

It is known to prepare 4-tertiary-butylphenyl salicylate by reaction of 4-tertiary-butylphenol and salicylic acid in the presence of phosphorus oxychloride. The reaction proceeds readily, but is usually accompanied by the formation of a large proportion, e. g. 30 per cent by weight or more, of an undesirable by-product material, or residue, which results in low overall yields of the 4-tertiary-butylphenyl salicylate product. The by-product material is of unknown composition and has heretofore been considered as a waste or residue of the reaction for which little, if any, use has been known. Heating the by-product material alone in admixture with phosphorus oxychloride does not result in the formation of 4-tertiary-butylphenyl salicylate.

We have now discovered that the by-product material or residue obtained in the production of 4-tertiary-butylphenyl salicylate by reaction of 4-tertiary-butylphenol and salicylic acid in the presence of phosphorus oxychloride (POCl₃) can be incorporated, or mixed, with 4-tertiary-butylphenol and salicylic acid and the resulting mixture heated to a reaction temperature in the presence of phosphorus oxychloride to form 4-tertiary-butylphenyl salicylate in good yield. We have further found that incorporating or adding the by-product material from a previous reaction with the starting materials of the next or a succeeding reaction not only increases the overall yield of the 4-tertiary-butylphenyl salicylate product, but also appears to reduce or prevent the tendency toward the formation of the by-product material. The by-product material has an effect of initiating the reaction and causing the same to proceed rapidly and smoothly until it is substantially complete. Surprisingly, it has been found that the by-product material from the reaction can be employed in successive reactions, as hereinafter specified, for any number of times to form good yields of the 4-tertiary-butylphenyl salicylate product.

The by-product material or residue from a preceding or a previous reaction of 4-tertiary-butylphenol and salicylic acid in the presence of a phosphorus oxyhalide, e. g. phosphorus oxychloride, may be employed in any desired amounts relative to the 4-tertiary-butylphenol and the salicylic acid employed in the reaction. In general, the yield of 4-tertiary-butylphenyl salicylate is dependent for the most part upon the relative proportion of the by-product material added to the reaction within certain limits. The by-product material is usually employed in amounts corresponding to from 0.2 to 1.5, preferably from 0.4 to 1.5, parts by weight per part of the combined weight of the 4-tertiary-butylphenol and the salicylic acid used, although it may be used in larger proportions.

The 4-tertiary-butylphenol and the salicylic acid starting materials may be employed in any desired proportions, but for reasons of economy are preferably used in equimolecular proportions or thereabout, i. e. in amounts corresponding to approximately on molecular proportion of the 4-tertiary-butylphenol per molecular equivalent proportion of the salicylic acid.

The phosphorus oxychloride is usually employed in amounts corresponding to from 0.3 to 0.5 of the molecular equivalent of the 4-tertiary-butylphenol, or the salicylic acid starting materials, although somewhat larger amounts may be used.

The reaction which occurs readily at temperatures between 80° and 150° C. is preferably carried out at temperatures between 85° and 120° C., and at atmospheric or substantially atmospheric pressure. In practice, the 4-tertiary-butylphenol and the salicylic acid starting materials, together with the by-product material from a previous reaction of the same, are mixed together in the desired proportions. The mixture is heated to a temperature between 85° and 90° C. and agitated, or stirred. Thereafter, an amount of phosphorus oxychloride sufficient to effect a reaction between the 4-tertiary-butylphenol and the salicylic acid is added to the mixture in continuous manner, or intermittently, over a period of about one-half hour or longer. The mixture is preferably maintained at a reaction temperature of from 100° to 120° C. until the reaction is substantially complete. The reaction is usually complete in from 2 to 5 hours at a reaction temperature of 100° C. The hydrochloric acid (HCl) evolved during the reaction may be absorbed by any conventional manner, e. g. by absorption in water.

After completion of the reaction the mixture is washed with hot water and the oil layer separated. In this connection it may be mentioned that best results are frequently obtained by carrying out the washing operation while the mixture is at a temperature of about 80° C., employing an amount of water corresponding to from 0.6 to 1.2 parts by weight of the water per part of the reaction mixture. The oil layer or crude product, which is heavier than water usually settles rapidly and is separated by decanting or by other conventional manner. The oil or crude product is conveniently dried by heating the same to a temperature of 135° C. at atmospheric pressure to remove water, or by heating in vacuum to a lower temperature. The oil is advantageously dried soon after the washing operation in order to reduce the tendency toward hydrolysis of the 4-tertiary-butylphenyl salicylate product, i. e. the oil or crude product should not be maintained in a wet condition for prolonged periods of time.

The dry oil, after cooling to a temperature of about 80° C., is mixed with an alcohol, e. g. ethyl alcohol, and the solution is cooled to a temperature of about 20° C., or below, to crystallize the 4-tertiary-butylphenyl salicylate product. In general, an amount of the alcohol corresponding to from 0.5 to 1, preferably 0.6 to 0.8 part by weight per part of the oil is satisfactory. The 4-tertiary-butylphenyl salicylate may be separated from the mother liquor by any conventional manner, e. g. by filtering, or by centrifuging, and is washed with alcohol and dried.

The mother liquor and the wash liquor are combined and the alcohol recovered by distillation or evaporation. Usually the alcohol is recovered by distillation of the mixture at atmospheric pressure until the temperature of the mixture in the still pot is about 135° C. Thereafter, the distillation is continued at subatmospheric pressure until the mixture is substantially free of alcohol and water. Heating the mixture to a temperature of 160° C. at an absolute pressure of 50 millimeters of mercury, or less, is usually satisfactory to remove the alcohol.

The solvent free residue recovered from the mother liquor, after crystallization of the 4-tertiary-butylphenyl salicylate from the reaction mixture of 4-tertiary-butylphenol and salicylic acid in the presence of phosphorus oxychloride, is a liquid at temperatures of about 60° C., or higher. It partially solidifies on cooling to ordinary temperatures, e. g. a temperature of 25° C., on standing over a period of several days. The residue consists principally of a complex product of unknown composition, together with lesser amount of 4-tertiary-butylphenol and salicylic acid. This solvent free residue or by-product material, recovered from the mother liquor after crystallization of the 4-tertiary-butylphenyl salicylate product, is incorporated or mixed with the 4-tertiary-butylphenol and the salicylic acid starting materials employed in a succeeding reaction to produce an improved yield of the 4-tertiary-butylphenyl salicylate product.

The following examples illustrate ways in which the principle of the invention has been applied, but are not to be construed as limiting the scope of the invention.

EXAMPLE 1

A mixture consisting of 150 grams (1 mole) of 4-tertiary-butylphenol and 138 grams (1 mole) of salicylic acid was placed in a reaction flask equipped with a reflux condenser, a dropping funnel and a stirrer. The mixture was heated to a temperature of from 88°–92° C. and stirred. Thereafter, 77 grams (0.5 mole) of phosphorus oxychloride (POCl$_3$) was added to the mixture over a period of about one-half hour. The temperature of the mixture was gradually raised to 100° C. over a period of 0.5 hour longer and the mixture was maintained at a temperature of 100° C. for a time of 2 hours. The hydrochloric acid evolved from the reaction was absorbed in water. The reaction mixture was washed with hot water and the oil layer separated and dried by heating the same to a temperature of 135° C. The crude product was cooled somewhat, mixed with about 180 grams of ethyl alcohol and the mixture cooled to crystallize the 4-tertiary-butylphenyl salicylate. The crystalline product was separated by filtering the mixture and was washed with alcohol. The product was recrystallized from ethyl alcohol and dried. There was obtained 161.8 grams of 4-tertiary-butylphenyl salicylate as snow-white crystals. The yield was 59.8 per cent of theory, based on the 4-tertiary-butylphenol and the salicylic acid starting materials. The filtrate or mother liquor was combined with the alcohol wash liquor and the alcohol evaporated. There was obtained 110.2 grams of residue, or by-product material, from the reaction. This by-product material, together with 150 grams (1 mole) of 4-tertiary-butylphenol and 138 grams (1 mole) of salicylic acid was placed in the reaction flask and the experiment repeated, using 77 grams (0.5 mole) of phosphorus oxychloride. The time and temperature conditions for carrying out the reaction and the procedure for recovering the 4-tertiary-butylphenyl salicylate and the by-product material from the reaction mixture were the same as just described. There were obtained 201 grams of 4-tertiary-butylphenyl salicylate as white crystals and 168 grams of by-product material. The yield of 4-tertiary-butylphenyl salicylate was 74.1 per cent of theory, based on the 4-tertiary-butylphenol and the salicylic acid starting materials. The 168 grams of by-product material was added to 150 grams of 4-tertiary-butylphenol and 138 grams of salicylic acid and the experiment repeated, using 77 grams of phosphorus oxychloride. There were obtained 224.6 grams of 4-tertiary-butylphenyl salicylate as white crystals and 181 grams of by-product material. The yield of 4-tertiary-butylphenyl salicylate was 83 per cent of theory, based on the 4-tertiary-butylphenol and the salicylic acid starting material. The table states the parts by weight of 4-tertiary-butylphenol, salicylic acid and by-product material, employed in each of the experiments and gives the ratio of the by-product material in parts by weight per part of the combined weight of the 4-tertiary-butylphenol and the salicylic acid starting material employed in each of the reactions. The table also gives the yield of 4-tertiary-butylphenyl salicylate, based on the 4-tertiary-butylphenol and the salicylic acid starting materials, together with the parts by weight of the by-product material obtained in each of the reactions.

*Table*

| Run No. | Starting Materials | | | | Products | |
|---|---|---|---|---|---|---|
| | Parts 4-tertiary-Butyl Phenol | Parts Salicylic Acid | Parts By-Product, Material | Ratio By-Product, Reactants | Percent Yield 4-tertiary-Butylphenyl Salicylate | Parts By-Product Material |
| 1 | 150 | 138 | 0 | --------- | 59.8 | 110.2 |
| 2 | 150 | 138 | 110.2 | 0.38 | 74.1 | 168 |
| 3 | 150 | 138 | 168 | 0.58 | 83.0 | 181 |

EXAMPLE 2

A charge of 330.3 grams of the by-product material (obtained from a previous reaction of equimolecular proportions of 4-tertiary-butylphenol and salicylic acid in the presence of phosphorus oxychloride by procedure similar to that described in Example 1) together with 150 grams (1 mole) of 4-tertiary-butylphenol and 138 grams (1 mole) of salicylic acid was placed in a reaction flask equipped with a reflux condenser, a dropping funnel and stirrer. The mixture was heated to a temperature between 85° and 90° C. and stirred. Thereafter, 77 grams (0.5 mole) of phosphorus oxychloride (POCl₃) was added to the mixture through the dropping funnel over a period of 0.5 hour. The temperature of the mixture was gradually raised to 100° C. over a period of 0.5 hour longer and the mixture maintained at a temperature of 100° C. for a time of 2 hours. The hydrochloric acid evolved in the reaction was absorbed in water. The reaction mixture was washed with hot water and the oil layer separated. The oil was heated to a temperature of 135° C. to vaporize water, then cooled somewhat and mixed with an equal weight of ethyl alcohol. The mixture was cooled to crystallize the 4-tertiary-butylphenyl salicylate. The crystalline product was separated by filtering the mixture and was washed with ethyl alcohol. It was recrystallized from ethyl alcohol and dried. There was obtained 243.2 grams (0.9 mole) of 4-tertiary-butylphenyl salicylate as snow-white crystals having a melting point of 63.2° C. The yield was 90 per cent of theory, based on the 4-tertiary-butylphenol and the salicylic acid starting materials. The filtrate together with the alcohol wash liquors were combined and the alcohol evaporated. There was obtained 357.2 grams of residue, or by-product material, from the reaction.

EXAMPLE 3

The experiment described in Example 2 was repeated, except that 385.7 grams of by-product material from a previous reaction of 4-tertiary-butylphenol and salicylic acid was added to the 4-tertiary-butylphenol and the salicylic acid employed in the reaction. The time and temperature conditions for carrying out the reaction and the procedure for recovering the 4-tertiary-butylphenyl salicylate and the by-product material were the same as described in Example 2. There were obtained 268.4 grams of 4-tertiary-butylphenyl salicylate melting at 63.1° C. and 363.2 grams of by-product material. The yield of 4-tertiary-butylphenyl salicylate was 99.2 per cent of theory, based on the 4-tertiary-butylphenol and the salicylic acid starting materials.

EXAMPLE 4

A mixture consisting of 75 grams (0.5 mole) of 4-tertiary-butylphenol and 69 grams (0.5 mole) of salicylic acid, together with 181.6 grams of the by-product material from a previous reaction of equimolecular proportions of 4-tertiary-butylphenol and salicylic acid in the presence of phosphorus oxychloride, was placed in a reaction flask equipped with a reflux condenser, a dropping funnel and stirrer. The mixture was heated to a temperature of 89° C. and stirred. Thereafter, 38.5 grams (0.25 mole) of phosphorus oxychloride was added to the mixture over a period of 0.5 hour. The temperature of the mixture was gradually raised to 100° C. over a period of 0.5 hour longer and the mixture was maintained at a temperature of 100° C. for a time of 2 hours. The reaction mixture was washed with 200 cc. of hot water and the oil layer separated and dried by heating the same to a temperature of 135° C. There was obtained 318.8 grams of crude product. The crude product was dissolved in 197 grams of ethyl alcohol and the mixture cooled to crystallize the 4-tertiary-butylphenyl salicylate. The crystalline product was separated by filtering the mixture and was washed with 80 grams of alcohol. The product was recrystallized from 95 grams of ethyl alcohol, was washed with alcohol and dried. There was obtained 122.9 grams of 4-tertiary-butylphenyl salicylate as snow-white crystals having a freezing point of 63.1° C. The yield was 91 per cent of theory, based on the 4-tertiary-butylphenol and the salicylic acid starting materials. The filtrate or mother liquor was combined with the alcohol wash liquors from the crystalline product and the alcohol evaporated. There was obtained 189.2 grams of residue.

Other modes of applying the principle of the invention may be employed instead of those explained, change being made with regard to the steps or compounds herein employed, provided the step or steps or the compounds stated in any of the following claims or the equivalent of such steps or compounds be employed.

We claim:

1. In a method for making 4-tertiary-butylphenyl salicylate by reaction of 4-tertiary-butylphenol and salicylic acid in the presence of phosphorus oxychloride, the improvement which consists in adding to the reaction mixture the by-product material from a previous reaction.

2. In a method for making 4-tertiary-butylphenyl salicylate by reaction of 4-tertiary-butylphenol and salicylic acid in the presence of phosphorus oxychloride, the improvement which consists in adding to the reaction mixture at least 0.2 part by weight of the by-product material from a previous reaction per part of the combined weight of the 4-tertiary-butylphenol and the salicylic acid.

3. In a method for making 4-tertiary-butylphenyl salicylate by reaction of 4-tertiary-butylphenol and salicylic acid in the presence of phosphorus oxychloride, the improvement which consists in adding to the reaction mixture at least 0.2 part by weight of the by-product material from a previous reaction per part of the combined weight of the 4-tertiary-butylphenol and the salicylic acid, and heating the mixture to a reaction temperature between 80° and 150° C.

4. A process as claimed in claim 3 wherein there is added to the reaction mixture from 0.4 to 1.5 parts by weight of the by-product material from a previous reaction.

5. A process as claimed in claim 4 wherein the reaction is carried out at a temperature between 85° and 120° C.

6. A process for making 4-tertiary-butylphenyl salicylate which comprises, heating approximately equal molecular proportions of 4-tertiary-butylphenol and salicylic acid to a reaction temperature between 80° and 150° C. in the presence of phosphorus oxychloride, while in admixture with at least 0.2 part by weight of the by-product material from a previous reaction of 4-tertiary-butylphenol and salicylic acid per part of the combined weight of the 4-tertiary-butylphenol and the salicylic acid, and thereafter separating the 4-tertiary-butylphenyl salicylate from the reaction mixture.

7. A process as claimed in claim 6 wherein the reaction is carried out while in admixture with from 0.4 to 1.5 parts by weight of the by-product material from a previous reaction of 4-tertiary-butylphenol and salicylic acid per part of the combined weight of the 4-tertiary-butylphenol and the salicylic acid.

8. A process as claimed in claim 7 wherein the reaction is carried out at a temperature between 85° and 120° C. and the 4-tertiary-butylphenyl salicylate is recovered from the crude product by crystallization from an alcohol.

WESLEY C. STOESSER.
EDMUND H. SOMMERFIELD.

REFERENCES CITED

The following references are of record in the file of this patent:

Groggins: Unit Processes in Organic Synthesis, pp. 629 and 655, 1947 edition, McGraw-Hill Book Co., Inc., New York, N. Y.